June 23, 1931.  W. O. SNELLING  1,811,765
APPARATUS AND METHOD FOR TESTING THE EFFECTIVENESS
OF PROTECTIVE MEDIUMS
Filed Dec. 7 1928
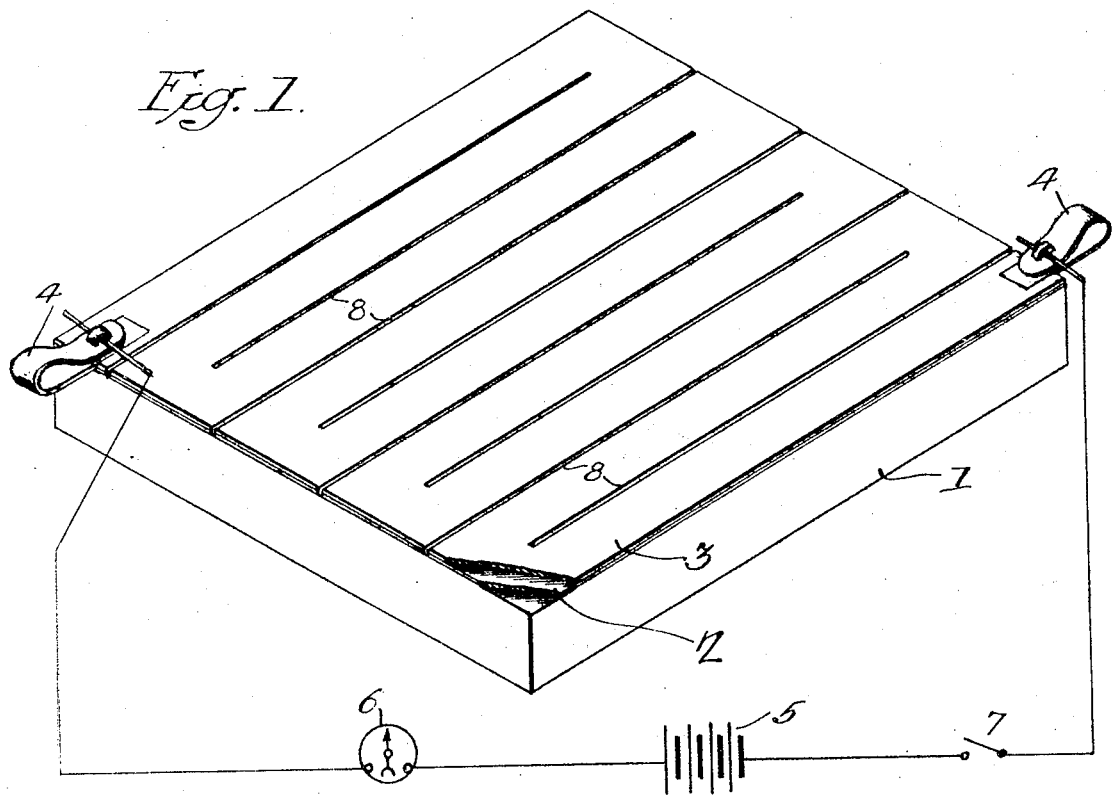
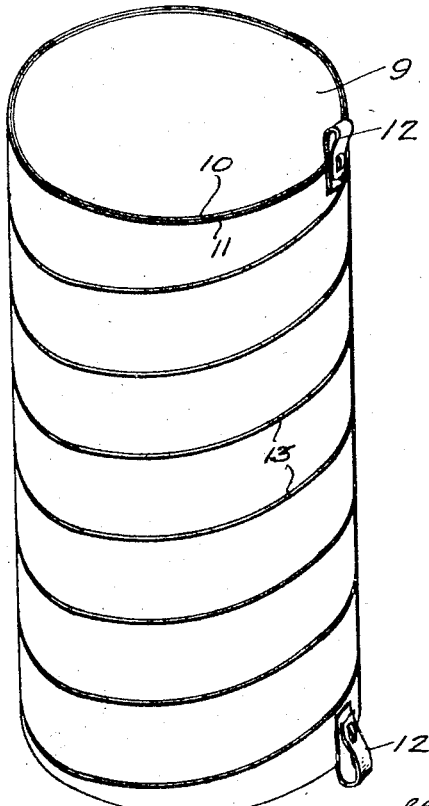

Patented June 23, 1931

1,811,765

UNITED STATES PATENT OFFICE

WALTER O. SNELLING, OF ALLENTOWN, PENNSYLVANIA, ASSIGNOR TO TROJAN POWDER COMPANY, OF NEW YORK, N. Y., A CORPORATION OF NEW YORK

APPARATUS AND METHOD FOR TESTING THE EFFECTIVENESS OF PROTECTIVE MEDIUMS

Application filed December 7, 1928. Serial No. 324,506.

The principal object of this invention is to provide an accurate and practical method of determining the effectiveness over any period of time of protective films of paint, varnish, lacquer, oil, paraffin and like coating mediums, the invention also residing in the hereindescribed novel apparatus by which the invention may be practiced.

Protective coatings of paint and like materials can deteriorate in two ways which may be entirely different in their nature and effects and therefore not necessarily allied. Deterioration in appearance does not necessarily imply deterioration in protective efficiency, and previous methods for determining protecting efficiency by appearance have accordingly been faulty. By the present invention, I provide means entirely independent of appearance for determining quantitatively and in dependable and accurate manner the deterioration with time of the protecting efficiency of a coating film.

In the attached drawings:

Figure 1 is a view in perspective of an illustrative apparatus made in accordance with my invention, and Fig. 2 is a modification within the scope of the invention.

My invention takes advantage of the fact that corrosion in a metallic element due to exposure of that element to a corroding medium, such as oxygen or moisture in the case of ferrous metals, affects the conductance of the element by increasing the resistance thereof to the passage of an electric current. By coating a corrodible metallic element with a coating medium and exposing the coated element to a corroding agent, I am thus able to determine the imperviousness to said agent of the coating medium and its protecting efficiency over any period of time in terms of electrical conductance or resistance of the said element, factors capable of accurate and quantitative measurement. By selecting a test element of such character that relatively slight corrosion has a marked effect upon the conductance of the element, the test may be made an extremely sensitive one, and for this purpose, I have found very thin films of electro-deposited metal admirably suited.

A general application of my invention will be in the testing of the durability of the common coating agents employed to protect surfaces from the deteriorating effects of atmosphere. The method, however, is well adapted to determining the imperviousness of coating film to particular corroding agents. Aluminum that has been amalgamated by being washed with a solution of a salt of mercury oxidizes with extraordinary rapidity from contact with air, and by employing such amalgamated aluminum as the test element in the afore-described method, the actual or relative imperviousness of films of coating mediums to oxygen may be readily determined. Test elements of any readily oxidizable alloy such as those containing sodium in conjunction with a metal normally of smaller affinity for oxygen may be used for the same purpose. By employing two test elements, one of metal relatively easily corroded by atmospheric oxygen but relatively resistant to moisture, and the other relatively easily corroded by moisture but relatively resistant to atmospheric oxygen, and both protected by a film of the same coating agent, the efficiency of the film in excluding atmospheric oxygen and water vapor respectively may be separately measured, this being of particular value in that oxygen and moisture are the atmospheric agencies possessing the greatest deteriorating effects upon ferrous metals. A test element of metallic sodium can be used to determine the effectiveness of a coating intended primarily to exclude moisture, and another of magnesium can be used for obtaining quick results in the testing of a paint film intended to resist ordinary atmospheric agencies including both moisture and oxygen.

With reference to the drawings, showing an embodiment including in simple and illustrative form elements used in practicing the invention, 1 is a base member of electrically non-conductive material, 2 is a thin film of graphite or other electrically conductive material applied to the surface of the member 1, and 3 is a thin film of metal electro-deposited upon the graphite. 4, 4 are terminal elements electrically associated with the metallic film 3 and affording means for connecting the film in an electric circuit. This circuit, in the illustrative form shown in Fig. 1, consists of a suitable source of current 5, a current meter 6, and a circuit-controlling switch 7. In order to increase the length of the path to be traversed by the electric current, I may groove the films 2 and 3, as indicated at 8.

The material of the film 3 must be such that this element is susceptible to modification as to conductance by influences from an external source. Preferably, I employ a ferrous metal, which is subject to corrosion by atmospheric agencies, the formation of iron oxide having the effect of decreasing the conductance of the element as a whole by increasing its resistance to an electric current.

In utilizing the aforedescribed device in the practice of my invention, I may coat the exposed metallic surface of the element 3 with a film of paint, the effectiveness and durability of which as a protecting medium is to be tested. Thereafter, periodic readings may be taken of the current flow through the circuit, these readings forming a basis for determination of the conductance of the element 3 at the various periods. Obviously, any conductance variation constitutes a measure of the deterioration by corrosion of the metal film 3 and of the decreasing effectiveness of the protective film to prevent this deterioration.

A convenient way of expressing the results of the tests is in terms of percentages of the initial conductance. The conductance of the system after the protective coating has been applied may be taken as 100%, representing the initial condition of the system, and the periodically reduced conductance expressed in each instance on the percentage basis may be used as the measure of the condition of the coating film. Generally, the first few percent of deterioration are the most significant, the time required to produce a deterioration of 1% to 10%, for example, being ordinarily sufficient to form an entirely adequate determination of the quality of the film.

It will be apparent that illustrative embodiment shown in the drawings may in practice be modified to advantage by utilization of a Wheatstone or equivalent bridge or a potentiometric null or other refined method for measuring the varying resistance of the test element to passage of current.

In Fig. 2, I have illustrated a modification of the device in which a base cylinder 9 of electrically inert material, such as wax, may be given a thin coating 10 of graphite or other suitable conductive material for reception of a thin film 11 of metal, such as iron, electro-deposited upon the graphite. Associated with the metallic film at top and bottom of the cylinder are terminals 12, 12, by means of which the device may be connected in an electric circuit as described above. A spiral groove 13 may be utilized in this instance to increase the length of the path which the electric current will have to travel through the conductive elements.

It is obvious that the invention is not restricted to a metallic test element of electro-deposited metal, since any metallic element, subject as described to modification as to conductance, might be used. Metallic elements of restricted dimensions, such as thin sheets or thin electro-deposited films, are desirable, in that they are more immediately sensitive to the effects of the conductance-changing influences. Where sheets are used either one side or both sides may be exposed to the atmosphere or other corroding agencies. Where but one side of a sheet is to be exposed, the other side should be protected by an entirely impervious covering of wax or other material of like nature. Where both sides of a sheet are to be exposed, the sheet may be conveniently supported at the edges so that the entire central area of the sheet is exposed to the corroding agencies. Obviously, the device is capable of use in testing all forms of coating mediums regardless of whether the hardening of the initially liquid film is brought about by heat, evaporation of a solvent, by chemical oxidation, or in other manner.

I claim:

1. The method of testing the ability of a protecting medium to withstand progressive deterioration, which comprises applying a film of said medium to an electrically conductive material, exposing the coated surface to an agent capable of affecting the conductance of said material, and determining the deterioration of the said film by successive measurements of the conductance of said material.

2. The method of testing the ability of a protecting medium to withstand progressive deterioration, which comprises applying a film of said medium to an electrically conductive material, exposing the coated surface to a fluid having a deteriorating effect on the film and including an agent capable of affecting the conductance of said material, and determining the deterioration of the said film by successive measurements of the conductance of said material.

3. The method of testing the ability of a protecting medium to withstand progressive deterioration by the atmosphere, which comprises applying a film of said medium to an electrically conductive material subject to corrosion by atmospheric agencies, exposing the coated surface to the atmosphere, and determining the deterioration of the said film by successive measurements of the conductance of said material.

4. The method which consists in coating a surface of a corrodible metal with an adherent imperforate film of a liquid protecting medium, bringing about the solidification of such liquid film to form a solid adherent imperforate film upon the surface of the corrodible metal, exposing the coated surface to a fluid having a corrodible effect upon the metal and a deteriorating effect upon the protecting film, and measuring progressive changes in the protecting effect of the said film by changes in the electrical resistance of the corroding metal.

5. The method which consists in coating a surface of a thin sheet of corrodible metal with an adherent imperforate film of a liquid protecting agent, bringing about the solidification of said liquid film to form a solid adherent imperforate film upon the surface of the sheet, exposing the coated surface of said sheet to a fluid having a corrodible effect upon the metal and a deteriorating effect upon the protecting film while substantially excluding said fluid from uncoated surfaces of said sheet, and measuring progressive changes in the protecting effect of the said film by changes in the electrical resistance of the corroding metal sheet.

6. The method which consists in coating a surface of an electrically deposited film of a corrodible metal with an adherent imperforate coating of a liquid protecting agent, bringing about the solidification of said agent to form a solid adherent imperforate coating upon the surface of the corrodible metal, exposing the coated surface to a fluid having a corrodible effect upon the metal and a deteriorating effect upon the protecting coating while substantially excluding said fluid from unprotected surfaces of the metal, and measuring progressive changes in the protecting effect of the protecting film by changes in the electrical resistance of the corroding metal.

7. The method which consists in coating a surface of an electrically deposited film of ferrous metal with an adherent imperforate coating of a liquid protecting agent, bringing about the solidification of said liquid to form a solid adherent imperforate coating upon the surface of the metal, exposing the coated surface to a fluid having a corrodible effect upon the metal and a deteriorating effect upon the protecting film while substantially excluding said fluid from exposed surfaces of the metal, and measuring progressive changes in the protecting effect of the coating by changes in the electrical resistance of the corroding metal.

8. The method of testing the ability of a protecting medium to withstand progressive deterioration, which comprises applying a film of an electrically non-conducting coating agent to a surface of a readily corrodible electrically conducting material, exposing the coated surface to a fluid having a corrodible effect upon the conducting material and a deteriorating effect upon the protecting film while substantially excluding said fluid from uncoated surfaces of the material, and determining the deterioration of the protecting film by successive measurements of the electrical conductance of the conducting material.

9. The method of testing the ability of a protecting medium to withstand progressive deterioration, which comprises applying a film of said medium to an electrically conductive material, exposing the coated surface to an agent capable of affecting the electrical characteristics of said material, and determining changes in the electrical characteristics of the material as a measure of the progressive deterioration of the protecting film.

10. In a system for testing the ability of a protecting medium to withstand progressive deterioration, an electrically conductive corrodible element adapted for reception of a film of a coating medium to protect the element from a corroding agent to which it may be exposed, means for passing an electric current through said element, and means for determining changes in the electric characteristics of the element due to corrosion as a measure of the progressive deterioration of the protecting film.

11. In a system for testing the ability of a protecting medium to withstand progressive deterioration, a thin film of electrically deposited corrodible material adapted for reception of a coating film to protect the material from a corroding agent to which it may be exposed, means for creating a difference of electrical potential between parts of said electrically deposited film, and means for determining changes in the electrical characteristics of the deposited material due to corrosion as a measure of the progressive deterioration of the protecting film.

WALTER O. SNELLING.